United States Patent [19]

Schonenberg et al.

[11] Patent Number: 5,400,153
[45] Date of Patent: Mar. 21, 1995

[54] SYSTEM AND METHOD OF DETERMINING A REFERENCE VALUE FOR THE INTENSITY ASSOCIATED WITH A COLOR INDICATION VARIABLE OBTAINED BY SCANNING AN ORIGINAL WITH A COLOR SCANNING UNIT

[75] Inventors: Jacobus H. M. Schonenberg, JH Velden; Theodorus A. C. Kradolfer, LC Venlo, both of Netherlands

[73] Assignee: OCE-Nederland, B.V., Venlo, Netherlands

[21] Appl. No.: 917,963

[22] Filed: Jul. 24, 1992

[30] Foreign Application Priority Data

Jul. 26, 1991 [NL] Netherlands ............... 9101301
Nov. 14, 1991 [NL] Netherlands ............... 9101894

[51] Int. Cl.$^6$ ............... H04N 1/40; H04N 1/46
[52] U.S. Cl. ............... 358/516; 358/515; 358/518
[58] Field of Search ............... 358/500, 501, 505, 515, 358/516, 518, 530, 443

[56] References Cited

U.S. PATENT DOCUMENTS

| | | |
|---|---|---|
| 4,001,500 | 1/1977 | Lavery et al. |
| 4,578,711 | 3/1986 | White et al. ............... 358/282 |
| 4,679,073 | 7/1987 | Hayashi ............... 358/80 |
| 4,870,501 | 9/1989 | Yoshida ............... 358/284 |
| 4,975,768 | 12/1990 | Takaraga. |
| 4,987,485 | 1/1991 | Hirota ............... 358/80 |

FOREIGN PATENT DOCUMENTS 0188193 7/1986 European Pat. Off.
1541578 3/1979 United Kingdom.

*Primary Examiner*—Bentsu Ro
*Attorney, Agent, or Firm*—Birch, Stewart, Kolasch & Birch

[57] ABSTRACT

A method and system of determining a reference value for the intensity associated with a color indication variable and obtained by scanning an original with a color scanning unit the color scanning unit being adapted to scan the original point-by-point, the method comprising determining a locally valid reference value for each scanned point and for each color indication variable, provided the intensity value related thereto deviates from a defined standard value by less than a preset value, by adapting the then locally available reference value by using a fraction of the value representing the intensity in the case of the color indication variable concerned. For example, a white reference value (white point) can be determined for an original point by point, with the result that weak color tones which are perceived as white are also regarded as white, while in addition small variations in these weak color tones (e.g. uneven yellowing) are also noted as white.

14 Claims, 6 Drawing Sheets

SYSTEM AND METHOD OF DETERMINING A REFERENCE VALUE FOR THE INTENSITY ASSOCIATED WITH A COLOR INDICATION VARIABLE OBTAINED BY SCANNING AN ORIGINAL WITH A COLOR SCANNING UNIT

BACKGROUND OF THE INVENTION

1. Field of the Invention

The present invention relates to a color indication system, and more specifically, to a method of determining a reference value for the intensity associated with a color indication variable of a scanned color original.

2. Discussion of Related Art

If a white reference is to be determined as the reference value, it should be noted that the various support materials used for originals usually do not all have the same "white" color and therefore have different white reference values. On the one hand, this is due to the fact that although various kinds of white support materials, such as paper, which are available on the market are perceived as white, they nevertheless prove to have different white coloring if they are compared with one another. Secondly, this occurs in the case of originals which have been tinted (e.g., yellowed) due to sunlight or in some other way due to internal chemical action. Moreover, it occurs that a newspaper is printed on lightly tinted paper. When such originals are copies, reproduction of the background color is generally not required. In reproducing the background color, unnecessary toner material is used while no extra information value is added to the copy. Accordingly, it is a disadvantage when a user, feeding a yellowed original having only black and white information to a color reproduction system based on the U.C.R. principle having a black toner reproduction unit, finds that although the information is reproduced solely by the black toner unit, the color reproduction unit nevertheless has to come into operation solely and simply in order to reproduce the background color. This causes the cost price of a copy of such an original to increase quite significantly. Besides, in reproducing colored information it must be taken into account that pastel tints in a colored original may not be suppressed.

A method in which the maximum intensity values of color indication variables are determined for the original in its entirety, in fact during a pre-scan movement, and a white reference value (white point) for that original is calculated therefrom, is known from GB-A-1 541 578. EP-188 193 also describes a method in which determination of a white reference value of the entire original is effected by reference to a histogram compiled for each color indication variable. The methods described in these applications have, however, the disadvantage that they calculate only a single value for the white reference, which then has to be representative of the entire original. It is possible, however, that an original is not uniformly tinted, so that determining a uniform white reference value for the entire original is illogical. This should be noted as a disadvantage of the methods of determining a uniform white reference value as described in these applications. Moreover, the method described in EP-A-188 193 has the practical disadvantage that all the information relating to the color indication variables must first be stored in a memory and a then the white reference value of the original can be determined.

Similar considerations to those above also apply if another reference value, e.g. the black reference value, has to be determined. When black support materials are used, the materials again do not always have the same black background, and therefore have different black reference values, although these support materials are in fact perceived as being black. It is also possible that support materials for originals may have minor variations in a given color tint, e.g. as a result of consecutive manufacturing processes, and it may be desirable that the copies should have a uniform color tint as the background tint. In such a case, color reference values of the originals concerned should be determined, and they can then be converted to a uniform color reference value.

SUMMARY OF THE INVENTION

Therefore, it is an object of the present invention to provide a color indication system which will overcome the above-noted disadvantages.

If is a further object of the present invention to provide a method of determining a reference value in color intensity associated with a corresponding color indication variable obtained by scanning a color original.

A further object of the present invention is to provide a color reproduction system equipped with a point-by-point color scanning unit for generating associated color information and for processing the color information.

The foregoing objects and others are accomplished in accordance with the present invention, generally speaking, by providing a color scanning unit for scanning a color original point-by-point, each scanned point representing a certain color indication variable with an associated intensity value which is limited only by the maximum and minimum intensity values that the scanning equipment is capable of detecting. A reference value is determined for each scanned point, by reference to the reference value applicable to a preceding scanned point and based, as far as possible, on the signal information of a number of preceding scanned points which satisfy certain conditions as are hereinafter explained. A locally valid reference value is determined, as stated, for each scanned point and, accordingly, for each color indication variable, provided the intensity value related thereto deviates from a defined standard value by less than a present value, by adapting, starting from the data concerning the then locally available reference value, this available reference value using a fraction of the value representing the intensity in the case of the color indication variable concerned.

The result then obtained should still be corrected, e.g. by a standardization factor $N/(N+1)$, wherein N denotes a fixed preset value. For the intensity value U related to the color indication variable, this yields the following expression:

$$U'_{ref} = N \cdot (U_{ref} + U/N)/(N+1),$$

where
- $U'_{ref}$ = weighted average of reference values
- $U_{ref}$ = white reference value
- $U$ = reference value corresponding to color indication variables with a fixed predetermined value ($U_{ref,o}$) as an initial value for $U_{ref}$, as soon as the scanning of an original starts. This expression can readily be reduced to:

$$U'_{ref} = U_{ref} + (U + U_{ref})/(N+1).$$

According to the invention, the effect achieved is that a reference value, e.g. the white reference value, is determined by reference to the background tint of the scanned original, provided the background tint does not have too strong a color and is therefore obviously considered at perception as white. The additional effect of repeatedly determining the reference value anew is that any gradual shift or gradual intensity variation in the background tint is compensated for, so that any uneven yellowing is considered as white. Another advantage of the present invention is that the determination of the reference value and the related calculation of the color values of the various colored scanned points can be effected during the scanning of the original. The various computing operations, therefore, do not need to be put off until the entire original has been scanned. According to one preferred embodiment of the invention, an optional requirement is that, after a number of new reference values have been determined using a certain number of image dots or after the scanning of a certain number of scanning lines or after the scanning of a certain number of scanning lines have occurred subsequent to the first detection of a scanned point above the defined standard value, the deviation is brought to a lower value and, for the determination of a following new reference value, only a scanned point is involved which also deviates from the then valid reference value by less than the valid deviation. According to another preferred embodiment of the invention, the deviation is gradually reduced from the first to the second zone. The effect of this is that a scanned point having a light color tint the shade of which visibly deviates from that of the average background tint (and hence from the then valid white reference) is not considered as white, but as a color. Soft pastel tints are thus characterized as colors. The effect of choosing a relatively large deviation in the initial phase of the determination of the reference value, which initial phase is performed on the basis of scanned points situated on the normally information-free edge of the original, is that the determination of the white reference value is not effected by assessing only scanned points situated close to the first reference value, in this case close to the absolute white point.

In the method according to the present invention, a reference value is repeatedly determined using scanned points which satisfy the requirement that they deviate from a first reference value by less than a predetermined deviation. In the first instance only such points are qualified for consideration as a white point. The maximum deviation can be determined experimentally by determining the reflection values for the color components R, G and B of a large number of "white" and colored backgrounds, e.g. in the R-G-B color space in which the color components R, G and B can be regarded as color indication variables. From the measured reflection values of backgrounds, which are required to be still qualified as white, it is possible to derive the maximum permissible deviation from the white point selected as the first reference value.

Given a scale range of 256 units (8 bits intensity values) for each color component, it can be established that for the determination of reference values it is possible to involve those scanned points where: $R \geq 200$, $G \geq 180$ and $B \geq 170$. The point $R=G=B=255$ may be taken as the first reference value, for example. The above values are, however, arbitrary. If a more stringent white selection is preferred, higher threshold values can be selected, while lower values can be taken for a less stringent selection. Moreover, it is not necessary to choose the absolute white point as the first reference value. A point close to the absolute white point is also a possibility. Nor is it necessary, after a reference value has been determined on the basis of a large number of scanned points, to determine the next reference value on the basis of all the scanned points selected until then. The determination can also be performed on the basis of the last M scanned points and the new selected scanned point, M being chosen, for example, at 2047.

In order to prevent soft pastel tints from actively participating in the white reference determination, it is advantageous to specify as an essential condition that the deviation of a local intensity value in respect of the then valid reference value may not be greater than a predefined value. Since there are no reference values yet available at the starting phase of the method, the maximum detectable intensity value is selected for each color component as the initial constant in determination of the reference value. It has been found in practice, however, that the value of the deviation should nevertheless be chosen to be so small that the difference between the initial constant and the threshold value is, in practice, generally much greater than the deviation between the measured intensity value and the then valid local reference value. If the requirement concerning the permissible deviation between the then valid local reference value and the instantaneous intensity value were applied at the actual starting phase, it would mean that only intensity values very close to the absolute white point level, and hence originating from a pure white background, could participate in calculation of the reference value. However, this is contrary to the principle of the invention. To obviate this, the requirement concerning the permissible deviation between the then valid reference value and the instantaneous intensity value is specified as being applicable only after a reasonable number of white points have been detected and hence a reference value is reasonably known. Consequently, after a number of scanned points satisfying the criterion (e.g. 2048 scanned points) have been involved in the determination of the reference value, the permissible deviation is reduced, according to a preferred embodiment of the invention, in order that weak colored tints, such as pastel tints, should not be characterized as colorless but as colors. Good results are obtained by setting the permissible deviation in respect of the then valid reference value for each color component value at about 30 scale units. Preferably, in a following reference value determination, only those scanned points satisfying both the initially valid criterion (e.g. $R \geq 200$, $G \geq 180$ and $b \geq 170$) and the new criterion (e.g. $R = R_{ref} \pm 30$, $G = G_{ref} \pm 30$ and $B = B_{ref} \pm 30$) are then involved in a following reference value determination. For, scanning of the original still takes place at the edge portion of the original where there is usually no information and measurements can therefore be made unobstructedly in respect of the background color or tinting of the original. A second solution to this problem, which agrees in principle with the first solution, is to make the value of the permissible deviation equal, in the first instance, to the difference between the initial constant ($R_{ref,o}$) and the threshold value ($R_{thr}$), in order then to reduce the value of the permissible deviation, either at a discrete instant or in accordance with a sliding scale during the procedure, to the finally assessed permissible deviation.

Determination of a new reference value is effected, for example, on the basis of the equations:

$$R'_{ref} = N(R_{ref} + R_p/N)/(N+1)$$

$$G'_{ref} = N(G_{ref} + G_p/N)/(N+1)$$

$$B'_{ref} = B(R_{ref} + B_p/N)/(N+1)$$

where $R'_{ref}$, $G'_{ref}$, and $B'_{ref}$ respectively denote the red, green and blue components of the new reference value; $R_{ref}$, $G_{ref}$ and $B_{ref}$ respectively denote the red, green and blue components of the reference value still available; and $R_p$, $G_p$ and $B_p$ respectively denote the R, G and B values of the newly considered scanned point. If N=M is chosen, then N is the number of scanned points involved in the following determination.

The following conditions apply in this case:

$$R_p \geq \text{1st threshold value (e.g. 200)}$$

$$G_p \geq \text{1st threshold value (e.g. 180)}$$

$$B_p \geq \text{1st threshold value (e.g. 170)}$$

and (after the starting phase):

$$|R_p - R_{ref}|, |G_p - G_{ref}|, |B_p - B_{ref}|, < L,$$

where L denotes the second threshold value (e.g. 30).

The following applies to calculation of the tone value ($R'_p$, $G'_p$ and $B'_p$) of a scanned point on the basis of the (locally) valid reference value:

$$R'_p = R_p \cdot K/R'_{ref}$$

$$G'_p = G_p \cdot K/G'_{ref}$$

$$B'_p = B_p \cdot K/B'_{ref}$$

when:
$$R'_p < R'_{ref}$$

$$G'_p < G'_{ref}$$

$$B'_p < B'_{ref}$$

If this is not the case, then
$$R'_p = K$$

$$G'_p = K$$

$$B'_p = K$$

where K = the scale range.

Instead of common values L and K, it is also possible to use component-dependent values $L_R$, $L_G$, $L_B$ and $K_R$, $K_G$, $K_B$ in the instant equations.

The redetermination of a new reference value and the calculation of tone values of colored scanned points on the basis of the then valid reference value can, as already stated, be effected during the actual scanning of the original. As soon as an image line or image surface is scanned by the scanning unit the calculations by the computing unit coupled to the scanning unit can start. Consecutive scanning lines are preferably traversed by the computing unit in opposite directions to ensure that after the last scanned point of one scanning line has been evaluated the computing unit proceeds with the adjoining point to be scanned of the next scanning line. The effect of this is that any gradual alteration of the background tint (yellowing) at or near an edge of the scanned original is correctly involved in the reference value determination.

The size of the deviation mentioned in connection with the second criterion need not have a fixed value. It has been found that the intensity values obtained in the case of support material having a finer particle structure have a less fluctuating intensity curve than those of support material having, for example, a coarse-fibred structure. By updating the spread relating to the intensity values from the actual start of the scanning of the original and calculating a reference value, it is possible to use a spread-dependent value for the deviation in the second criterion at the start thereof.

Although the method indicated operates satisfactorily as regards determination of a sliding or adaptive white reference value using a threshold value, the performance of the system based thereon is coupled to the bottom limit of the detection zone within which the detected intensity values of the scanned points still participate in connection with the determination of the white point reference value, but this is independent of the intensity of the background color concerned. In other words, whether the original has a snow-white background, or a somewhat tinted or muddy background, the time required to determine a white reference value will in both cases be the same in principle. If an original is locally smeared at the edge (e.g. due to toner smearing or liquid stains, such as coffee stains), it may nevertheless still take some time before a first white reference value is determined, even if the original is snow-white in the other part. It is therefore logical for the determination of a white reference value to last for less time if the background color of the original, apart from some smeared parts, must be considered as being more a snow-white color. This is possible by profiting more from the diversity in intensity values associated with a color indication variable which are situated above the threshold. It is therefore advantageous when determining a white reference value to allocate to a scanned point a weighting factor related to the intensity value.

The method for determining a white reference value can therefore be advantageously used when it is effected by reference to a weighted average using a weighting circuit having a plurality of weighting levels. A specific weighting factor (b) is allocated to each weighting interval situated between two consecutive weighting levels. For example, it is possible to make the weighting factors higher in proportion as the weighting intervals are closer to the maximum reference value. It is also possible to give the weighting factors a different configuration in the event that the adjustment of the color scanner and the types of support materials associated with the originals so require. One particularly advantageous embodiment of a weighting circuit is obtained by using a look up table. This look up table adds an associated weighting factor to each combination of values representing color information of a scanned point. An additional advantage accompanying the introduction of the weighting mechanism thus described relates to the time at which the second criterion comes into operation, and which can come in as soon as the sum of a weighted number of scanned points has exceeded a certain standard value (M). In proportion as an original is whiter, the time at which the sum of a weighted number of scanned points has exceeded the standard value (M) and the second criterion comes in, will be reached after fewer scanned points.

The background color may vary rapidly in intensity or tint because, for example, an original was only partly exposed to the outside light and has yellowed. This is the case, for example, with an original which was only partly pushed into a book. In such a case it is logical for the reference value to adapt to the changed situation somewhat more rapidly. This can be done by increasing the reference value of the previous point with a larger fraction (b/N) of the intensity value of the current scanned point and correcting the result with a standardization factor N/(N+b). In this way a "weighted average" is calculated to give reference value for the new scanned point, only the value associated with the last scanned point being given a weighting factor of "10" for example, and the preceding scanned points a weighting factor of "1." In practice a method of this kind can be applied only if the measured spread relating to the intensity values is small, and hence the support material of the original has a fine-fibred structure.

A method in which a fairly accurate indication regarding the reference value is first determined and then a rapid adaptation of a reference value once determined is carried out, is obtained by starting with the method of determining an average as reference value by reference to signal values using the fixed threshold value without a weighting mechanism and, as soon as there is some indication regarding the reference value, proceeding to the method of determining a weighted average by reference to intensity values, only the value associated with the last scanned point being given the said weighting factor b=10, and the preceding scanned points a weighting factor having the value "1" provided it has been established that the support material of the original has a fine-fibred structure.

One particularly advantageous alternative of the method is obtained by starting with accurately and rapidly determining reference values by reference to a weighted average using a weighting circuit having a plurality of weighting levels, and then proceeding to rapid adaptation of a reference value, once it has been obtained, by reference to a weighted average determination without using the weighting mechanism. A particular advantage of each of the methods is even obtained in that directly following the determination of a locally valid reference value for a scanned point re-calculation of the intensity values associated with the color indication variables at that scanned point can already be carried out in the meantime. For this purpose, a method to be performed according to the invention is complemented by establishing, by reference to a signal value determined for that scanned point for each color indication variable and taken from the signal value, an adapted intensity value relating to a color indication variable, using the scale conversion function based on the locally valid reference value for that scanned point and the scale range (K). Apart from a linear configuration of a scale conversion factor, it is also possible to introduce a non-linear configuration of the scale conversion factor, for example, by using the expression $Kf(U,U'_{ref})/U'_{ref}$, where $f(U,U'_{ref})$ denotes a non-linear function dependent on the local intensity value and the average intensity value. Using a look up table it is possible to read out the converted value directly when the local and average intensity values are supplied.

In the same way as the white reference value was determined as a reference value hereinbefore, with re-calculation of the intensity values therefrom, it is similarly possible to determine a black reference value or a color reference value.

BRIEF DESCRIPTION OF THE DRAWINGS

The invention will now be explained in detail with reference to the drawings wherein.

DETAILED DESCRIPTION OF THE INVENTION

The method of determining the white reference value in accordance with the invention per scanned point in the R-G-B color space is based on collecting intensity values ($R_p$, $G_p$, $B_p$) for each color component (R, G, B) line-by-line and for discrete positions on such a line. To this end, intensity measurements are carried out by means of a scanning unit for each point to be scanned on the consecutive scanning lines of the original subjected to exposure, and, after a number of corrective system steps and image processing steps have been performed, the measurements are suitable for conversion into control signals for the color printing units of the color copying device or for other color reproduction systems, such as a "flying spot scanner."

Scanning units which can be used for performing the method according to the present invention are generally indicated by the English term "line-scanner." This does not mean that a "line-scanner" must consist of a single row of photosensitive recording elements. Reasons associated with manufacturing technology and cost-effectiveness have often led to the development of other forms of scanning units which, with some modification, can be considered suitable for recording intensity signals for each required color component line-by-line and for each scanned point. Some suitable forms of scanning units for this purpose are known from GB-2,157,114, US-4,553,160, US-4,750,048 and US-4,866,512. It is also possible in principle to use what are known as "area-scanners" for performing the method according to the invention, it being possible, in the case of the parallel read-out of the line arrays, to perform the steps according to the invention in two ways:

On the one hand this is possible from a memory in which the intensity information read out is first stored for each scanned point and each color component. On the other hand, during the read-out of the intensity information, the method according to the invention can be performed by performing the same line-by-line in a direction perpendicular to the read-out direction of the line arrays. The successively arranged line arrays thus each deliver the intensity information of a single scanned point with which determination of the white reference value is then carried out for each scanned point and for each color component for the line defined by the scanned points.

Figure 1:
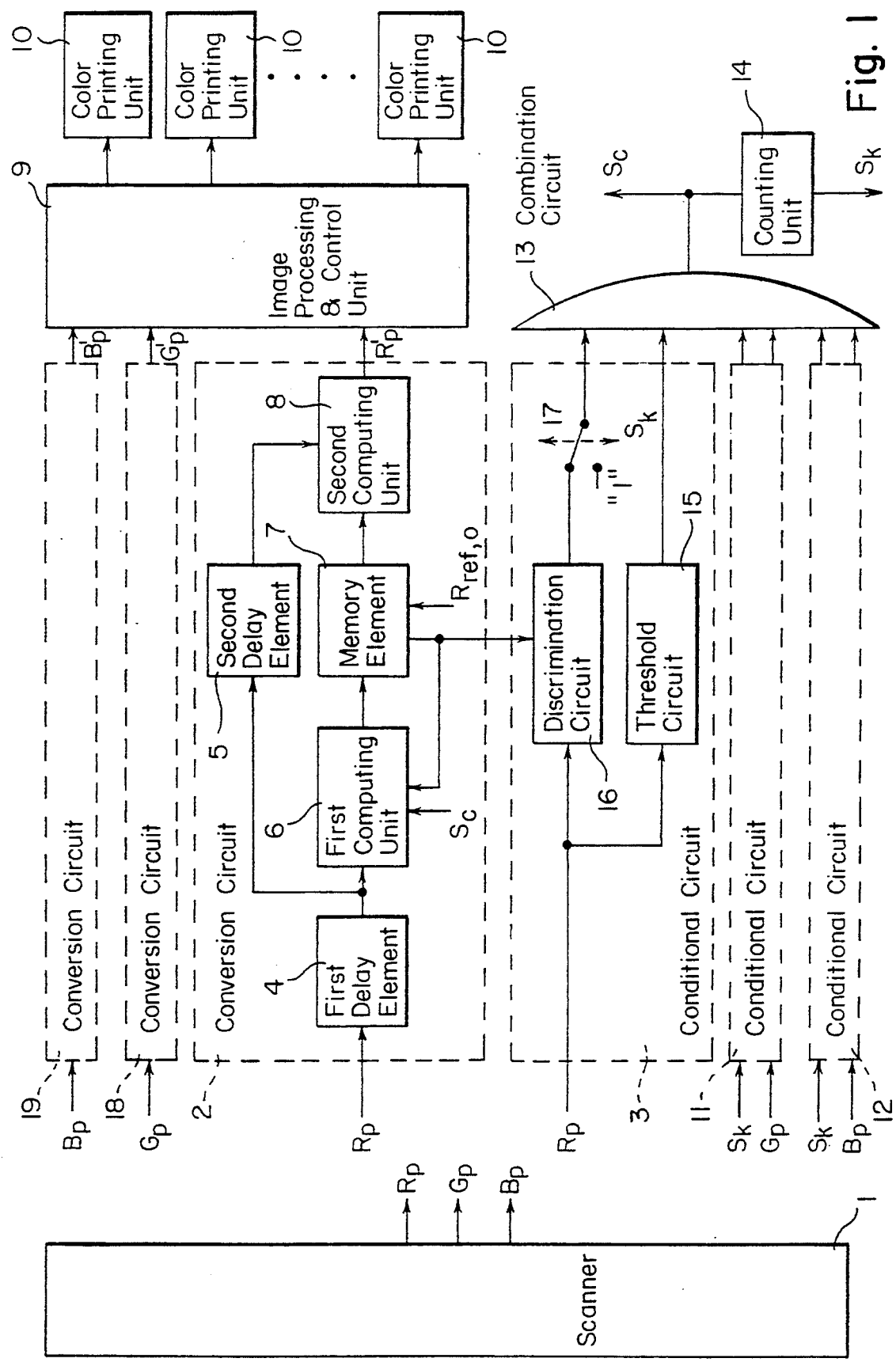
FIG. 1 is a block schematic of a possible embodiment of a color reproduction system.

In the color reproduction system shown as a block schematic in FIG. 1, a scanner 1 scans an original line-by-line and at discrete positions of each line opto-electrically. The scanner 1 is also adapted to generate for each scanned point signals $R_p$, $G_p$, and $B_p$ relating to brightness or intensity information for three color components R, G and B and perform thereon the necessary initial processing steps, such as MTF (Modulation Transfer Function), gamma and uniformity correction. The resulting signals are processed further in otherwise identical manner for each color component. Accordingly, it is logical to discuss in detail only the processing steps for one color component signal, in this particular case the signal ($R_p$) of the red color component. Only where necessary will the processing of the green and blue color component signal ($G_p$ and $B_p$) be discussed.

After A/D conversion in scanning unit 1, the signal $R_p$ is delivered in digital form both to a conversion circuit 2 and a conditional circuit 3. The conditional circuit 3 is adapted to generate a conditional circuit $S_c$ together with other circuits after certain conditions have been tested, such conditional signal $S_c$ determining the internal action of the conversion circuit. The conversion circuit 2 comprises a first delay element 4, to which the digitized signal $R_p$ is fed and the delay time of which is equal to the generation time of the signal $S_c$. The output signal $R_p$ of the delay element 4 is fed, on the one hand, to a second delay element 5 and, on the other hand, to a first computing unit 6. The conversion circuit 2 also comprises a memory element 7 and a second computing unit 8. At the start of the scanning of an original, the memory element 7 receives the initial value ($R_{ref,o}$), but thereafter the contents of the memory element are overwritten by each following value ($R_{ref}$) to be produced by the computing unit 6. By reference to the supplied signal $R_p$, a preset constant (N) and the value ($R_{ref,o}$ and $R_{ref}$ respectively) stored by the memory element 7, the first computing unit 6 is adapted to calculate a new value ($R'_{ref}$). The first computing unit 6 is energized for the calculation of a new value ($R'_{ref}$) by the conditional signal $S_c$, which will be explained in detail hereinafter. As soon as the new value ($R'_{ref}$) has been calculated, this value will be fed to the memory element 7 to overwrite the value still present there. The value ($R'_{ref}$) is also fed to the second computing unit 8 to determine a converted intensity value ($R'_p$) for the red color component signal. When three color components R, G, and B having the respective local intensity values $R_p$, $G_p$, and $B_p$ are delivered by the scanning unit 1, the above expressions thus become:

$$R'_{ref} = N(R_{ref} + R_p/N)/(N+1)$$

$$G'_{ref} = N(G_{ref} + G_p/N)/(N+1)$$

$$B'_{ref} = N(B_{ref} + B_p/N)/(N+1)$$

it being required that:
$$G_p > R_{thr}$$

$$G_p > G_{thr}$$

$$B_p > B_{thr}$$

and $\max(|R_p - R'_{ref}|, |G_p - G'_{ref}|, |B_p - B'_{ref}|) < L$, with L as a constant value within the scale range of the printing unit.

At the start of the scanning procedure on an original, $R_{ref,o} = G_{ref,o} = B_{ref,o} = K$, with K the value corresponding to the scale range. For the corrected intensity value ($R'_p$, $G'_p$ and $B'_p$) for each color component we then have:

$$R'_p = R_p \cdot K/R'_{ref}$$

$$G'_p = G_p \cdot K/G'_{ref}$$

$$B'_p = B_p \cdot K/B'_{ref}$$

when:
$$R'_p < R'_{ref}$$

$$G'_p < G'_{ref}$$

$$B'_p < B'_{ref}$$

If this is not so, then:
$$R'_p = K$$

$$G'_p = K$$

$$B'_p = K$$

Instead of common values L and K, it is also possible to use component-dependent values $L_R$, $L_G$, $L_B$ and $K_R$, $K_G$, $K_B$ for the equations.

Conversion circuits 18 and 19 for the green and blue color components respectively operate in a similar manner to conversion circuit 2.

To form the conditional signal, the system also comprises in addition to the conditional circuit 3 for the red color component, two identical conditional circuits 11 and 12 for the green and blue color components respectively, and a combination circuit 13 having the function of a logic AND gate. Here again the explanation of the conditional circuits will be restricted, as far as possible, to that of the red color component.

The conditional circuit 3 comprises a threshold circuit 15, a discrimination circuit 16 and a switching unit 17. The latter is controlled by a counting unit 14. The threshold circuit 15 tests which of the supplied $R_p$ values are situated above a certain predefined threshold ($R_{thr}$), and in each such case generates a "logic 1" signal. In a discrimination circuit 16 connected in parallel with the threshold circuit 15, a check is made which of the supplied $R_p$ values do not exceed a permissible predefined deviation from the calculated value ($R'_{ref}$) and generates in each such case a "logic 1" signal. The calculated value ($R'_{ref}$) is fed from the memory element 7 to the discrimination circuit 16. Since, however, the discrimination circuit 16 may be actively engaged in this process after a certain number of white point detections have been established by the counting unit 14 itself, the switching unit 17 is included between the discrimination circuit 16 and the combination circuit 13, a "logic 1" signal being present at its secondary input.

At the start of the scanning of each new original, the combination circuit 13 is supplied with the latter "logic 1" signal via the switching unit 17. Whenever all the inputs of the combination circuit 13 receive a "logic 1" signal and, hence a white point is detected, the counting unit 14 receives a counting pulse signal from the combination circuit 13. As soon as the counting unit 14 has counted a certain pre-defined standard value, for example the number of white points (M) in this case, the switching unit 17 is set to the switching position illustrated by means of the signal $S_k$, then to be generated by the counting unit 14, and the "logic 1" signals, thereafter to be generated by the discrimination circuit 16, are fed to the combination circuit 13. If required, M may be taken as equal to N.

The other two conditional circuits 11 and 12 operate similarly. At all times at which all the inputs of the combination circuit 13 receive a "logic 1" signal, the combination circuit 13 delivers the said signal $S_c$ to the first computing unit 6 of each of the conversion circuits 2, 18 and 19, and to the counting unit 14.

The value $R'_p$ and the values $G'_p$ and $B'_p$ delivered by the conversion circuits 18 and 19 for the green and blue color components (G and B) respectively will be fed for further processing to an image processing and control unit 9 which will finally generate control signals for controlling a color reproduction system such as the color printing units 10 used in a color copying machine or the "flying spot scanner."

In addition, it is possible to store the information in a memory in order to reproduce this information at a later time. In the above embodiment, there are performed those processing steps which are required for each scanned point for determining a local white reference value and establishing a signal value adapted to that white reference value for a color component in the same color space system, in this case the R-G-B system. Alternatively, the first processing step, i.e. determining for each scanned point and for each color component a locally valid reference value ($U'_{ref}$), can be performed in a first color space system, e.g. the R-G-B system, and the second processing step, i.e. establishing a signal value (V') adapted to the white point value for each color component can be performed in another color space system, e.g. the X-Y-Z system. In these conditions the intensity value (U) is converted to a signal value (V) in another color space system using transformation rules (see, for example: *R. W. G. Hunt: The Reproduction of Color in Photography, Printing & Television,* Ch. 8, 4th edition 1987, Fountain Press). Also, in the manner described, a locally valid reference value ($U'_{ref}$) is first determined for each scanned point and for each color component in the first color space system, whereupon conversion of this value ($U'_{ref}$) to the second color space system delivers a second value ($V'_{ref}$) by means of which an adapted signal value (V') is established from the signal value (V) already obtained by conversion.

Figure 2:
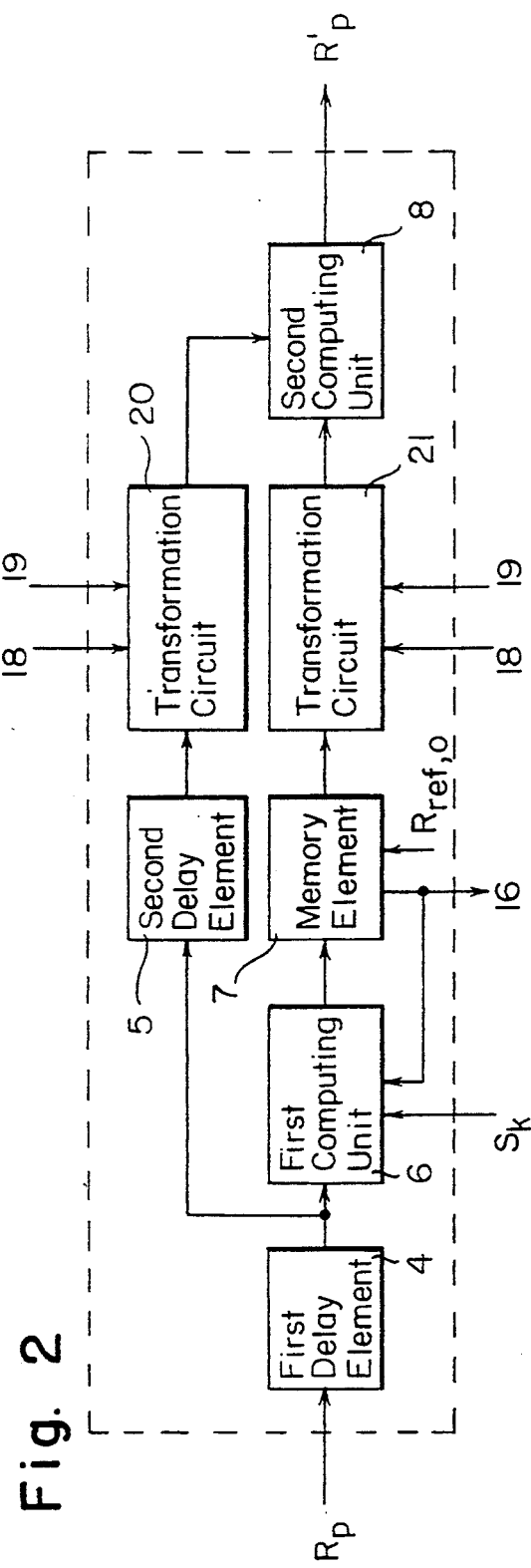
FIG. 2 is part of an alternative embodiment of the color reproduction system shown in FIG. 1.
Figure 6:
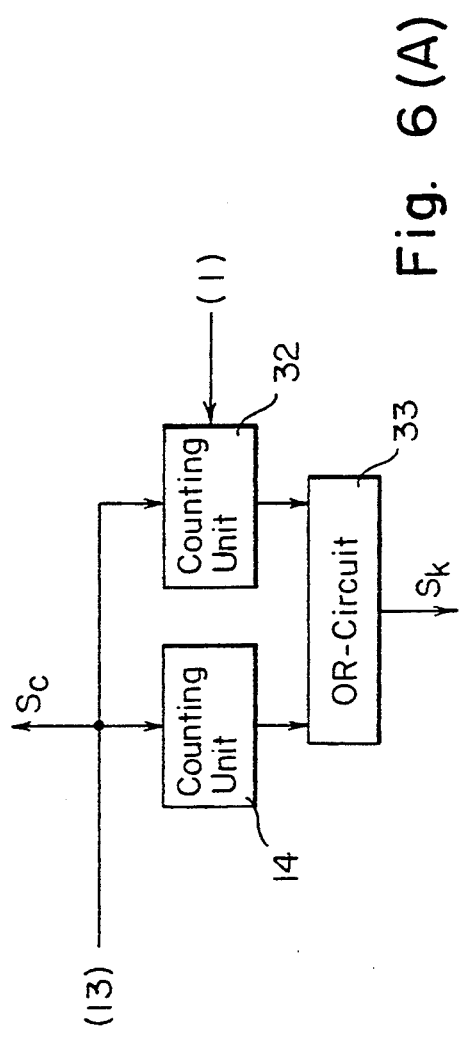
FIGS. 6A, 6B, 6C, and 6D are parts of alternate embodiments of color reproduction systems shown in FIGS. 1, 3, 4 and 5, respectively.

This embodiment of the method according to the invention will now be explained with reference to FIG. 2, in which only the essential part which has been changed in comparison with FIG. 1, i.e. the conversion circuit (2, 18, 19), is shown. Those units appearing in FIG. 2 which have a similar action to the units shown in FIG. 1 have corresponding reference numbers and will not be further discussed.

The conversion circuit shown in FIG. 2 again comprises a first delay element 4, to which the digitized signal $R_p$ is fed, and a second delay element 5 connected thereto and a first computing unit 6, to which the memory element 7 is connected. Both the signal ($R_p$) delayed by unit 5 and the signal stored by memory element 7 are then fed to a transformation circuit 20 and 21, respectively, for obtaining signals (X and $X'_{ref}$ respectively) in another color space system. It may be that the signal values of the other color components will also be involved in the transformation, as is the case, for example, in the transformation of the R-G-B system to the X-Y-Z system, and signals will therefore be fed from the other two conversion circuits (18, 19) to the transformation circuits (20, 21). In practice it is more efficient to include just one transformation circuit instead of two in the conversion circuit, and then calculate the values of X and $X'_{ref}$ alternately. It is even more efficient to use just one transformation circuit for all the conversion circuits. Where possible this can also take place for other units, so that there will be processing on the basis of time sharing. The two signals (X and $X'_{ref}$) are then fed to a second computing unit 8 to determine a converted intensity value (X'), by reference to which image processing takes place in the image processing and control unit 9. The other two conversion circuits deliver the other signal values Y' and Z' for the unit 9.

If the background coloring of the original to be copied changes in the sub-scanning direction, it is not advisable, after determining the white reference value of the last scanned point at the right-hand side of a line, to proceed with a following line starting with the first point to be scanned at the left-hand side of that line. In such a case, determination of the white reference value should proceed directly at the back at the extreme right-hand point to be scanned on the next line and then successively reversing to the successive points to be scanned situated to the left on that line.

Figure 3:
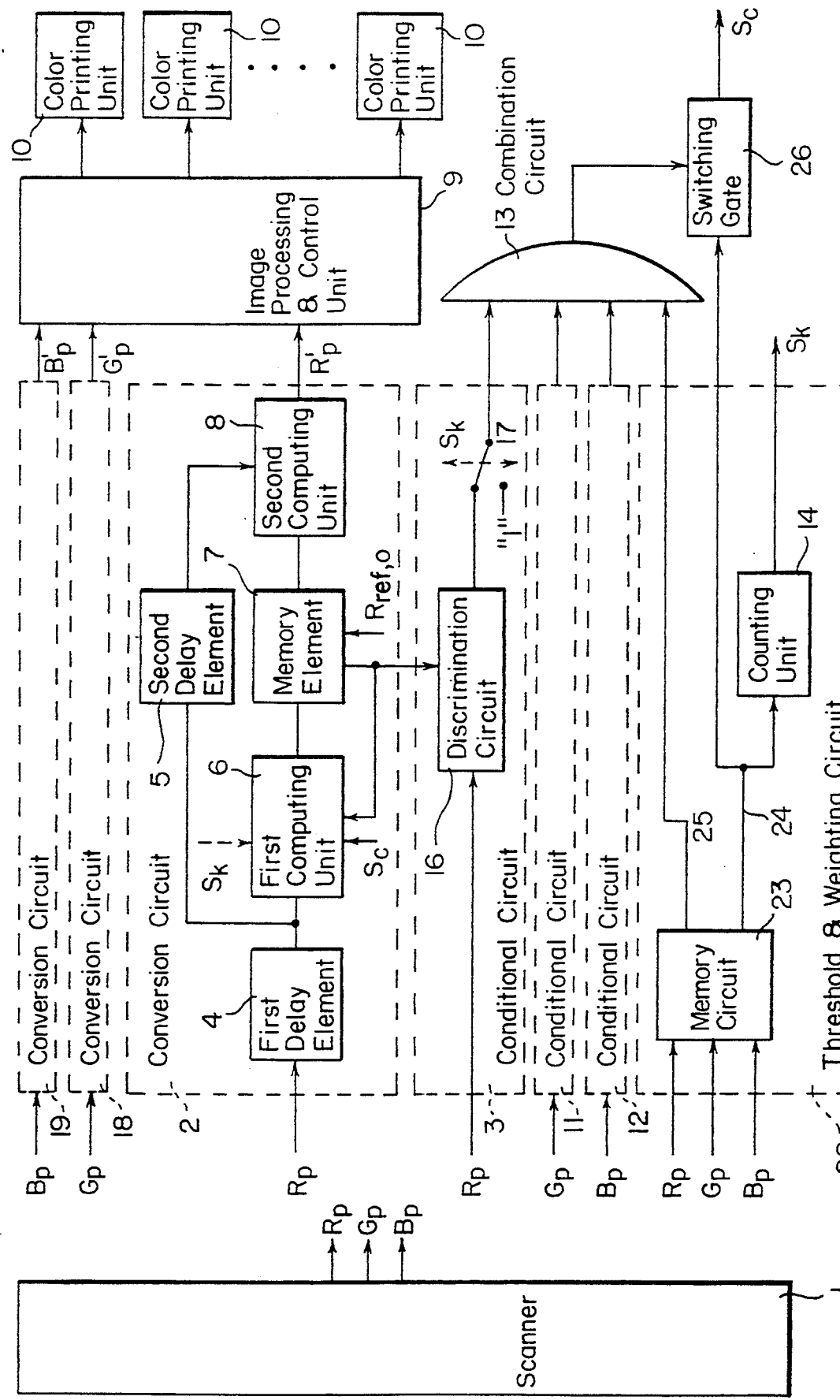
FIG. 3 is a second alternative embodiment of the color reproduction system shown in FIG. 1.

In the embodiment of a color reproduction system shown in FIG. 3, determination of the white point for each scanned point, i.e. a locally valid white reference value, is based on the idea of determining a weighted average ($U'_{ref}$) of the intensity values for each color component for a scanned point, and this can be done for example by increasing the white reference value ($U_{ref}$) of the previous scanned point by a fraction (a/(N+a)) of the intensity value (U) of the present scanned point and correcting the result with a normalization factor N/(N+a). Here (N) denotes a fixed predetermined value and (a) a weighting factor which will be described in detail hereinafter. This yields the following expression:

$U'_{ref} = N \cdot (U_{ref} + a \cdot u/n)/(N+a)$, with a fixed predetermined value $U_{ref,o}$ as initial value for $U_{ref}$, as soon as the scanning of an original starts. This expression can readily be reduced to:

$$U'_{ref} = U_{ref} + a \cdot (U - U_{ref})/(N+a).$$

In proportion as a scanned point has a higher intensity value (U), that point will also be assigned a higher weighting factor (a). This is done by introducing a number of level values in the zone defined by the threshold value ($U_{thr}$) and the maximum white reference value. A higher weighting factor (a) is, for example, also assigned in the event of a higher level value. A scanned point is then given that weighting factor (a) associated with the highest level value satisfied by the scanned point.

The units in this Figure which have a corresponding action to those of the units from the previous Figures have corresponding reference numerals and will not be discussed further.

When three color components R, G and B having the respective local intensity values $R_p$, $G_p$ and $B_p$ are delivered by the scanning unit 1, the expressions thus become:

$$R'_{ref} = N(R_{ref} + a \cdot R_p/N)/(N+a)$$

$$G'_{ref} = N(G_{ref} + a \cdot G_p/N)/(N+a)$$

$$B'_{ref} = N(B_{ref} + a \cdot B_p/N)/(N+a)$$

with the following requirements:

$R_p > R_{thr}$ $G_p > G_{thr}$ $BP > B_{thr}$ and $\max(|R_p - R'_{ref}|, |G_p - G'_{ref}|, |BP - B'_{ref}|) < L$
with L as a constant value within the scale range of the printing unit. At the start of the scanning procedure on an original $R_{ref,o} = G_{ref,o} = B_{ref,o} = K$ applies with K the value corresponding to the scale range. The factor (a) is the weighting factor to be used here.

The following then apply for the corrected intensity value ($R'_p$, $G'_p$ and $B'_p$) for each color component:

$R'_p = R_p \cdot K / R'_{ref}$ $G'_p = G_p \cdot K / G'_{ref}$ $B'_p = B_p \cdot K / B'_{ref}$ when:
$R'_p < R'_{ref}$ $G'_p < G'_{ref}$ $B'_p < B'_{ref}$ If this is not the case, then:
$R'_p = K$ $G'_p = K$ $B'_p = K$ In FIG. 3 the first computing unit 6 is adapted to calculate a new value of the weighted average ($R'_{ref}$) in the manner indicated before, by reference to the supplied signal $R_p$, a preset constant (N), data provided by signal $S_c$ concerning the weighting factor (a) to be used, and the value ($R_{ref,o}$ and $R_{ref}$ respectively) stored by the memory element 7. The first computing unit 6 is operative to calculate a new average value ($R'_{ref}$) whenever a weighting factor (a) unequal to zero is supplied.

In addition it is also possible to calculate a new reference value on the basis of N scanned points, by reference to the formula:

$$R'_{ref} = \left( \sum_{i=1}^{N} a_i \cdot R_i \right) / \left( \sum_{i=1}^{N} a_i \right), \text{ (Please explain the presence of } N \text{)}$$

where $R_i$ is the value of the R-component of the ith scanned points.

As soon as the new white reference value ($R'_{ref}$) has been calculated, this value will be fed to the memory element 7 for overwriting the value still present there. The value $R'_{ref}$ is also fed to the second computing unit 8 to determine a converted intensity value ($R'_p$) for the red color component signal.

For the formation of the signal Sc the system contains not only the conditional circuits 3 for the red color component but another two identically formed conditional circuits 11 and 12 for the green and blue color components respectively, a threshold and weighting circuit 22, a combination circuit 13 with a function comparable to that of a logic AND gate, and a switching gate 26. Here again the explanation of the conditional circuits will as far as possible be confined to that of the red color component.

The conditional circuit 3 comprises a discrimination circuit 16 and a switching unit 17. The switching unit 17 is controlled by a counting unit 14 which forms part of the circuit 22. The discrimination circuit 16 checks which of the supplied $R_p$ values do not exceed a permissible predefined deviation from the locally calculated value of the weighted average ($R'_{ref}$) and in each such case generates a "logic 1" signal. The calculated value of the weighted average ($R'_{ref}$) is fed from the memory element 7 to the discrimination circuit 16. Since, however, the discrimination circuit 16 may not be involved in this process before an indication has been obtained concerning the position of the white reference value to be expected, a switching unit 17 is included between the discrimination circuit 16 and the combination circuit 13, there being a "logic 1" signal on its secondary input. At the start of the scanning of each new original the latter "logic 1" signal is fed to the combination circuit 13 via the switching unit 17.

The other two conditional circuits 11 and 12 are operative in a similar manner. The threshold and weighting circuit 22 also comprises a memory circuit 23, such as a look up table. Suitable weighting factors (a) for a number of combinations of color component values ($R_p$, $G_p$ and $B_p$) are also included in the look up table 23. One possible embodiment of these weighting factors coupled to combinations of color component values is obtained by coupling:

the weighting factor a=1 to the combination
Rp=170, Gp=190 and BP=205, the weighting factor a=2 to the combination
Rp=187, Gp=205 and BP=215, the weighting factor a=3 to the combination
Rp=204, Gp=216 and BP=225, the weighting factor a=4 to the combination
Rp=221, Gp=229 and BP=235, the weighting factor a=5 to the combination
R=238, G=242 and B=245, These combinations of color component values represent a number of proportionally increasing weighting criteria. Other combinations of weighting factors are also possible, as will be explained hereinafter. If three input values, $R_p$, $G_p$ and $B_p$ are supplied, a check is made in the look up table 23 as to what is the highest weighting criterion still satisfied by the input values $R_p$, $G_p$ and $8_p$ supplied.

The look up table 23 then generates the weighting factor, (a) associated with that weighting criterion on line 24 for the counting unit 14 and increases the count therein accordingly.

As soon as the counting unit 14 reaches a given predefined count (M), it delivers a switching signal $S_k$ to the respective switching units 17 of the conditional circuits 3, 11 and 12. The switching units 17 then pass into the other switching position than that shown in the drawing. The look up table 23 (or a logic circuit coupled thereto) also generates a "logic 1" signal on output 25 whenever a group of input values $R_p$, $G_p$ and $B_p$ supplied satisfies one or other weighting criterion. Output 25 is also connected like the outputs of the conditional circuits 3, 11 and 12 to the input stage of the combination circuit 13. Whenever all the inputs of the combination circuit 13 are simultaneously supplied with a "logic 1" signal, circuit 13 generates an output signal acting as a control signal for the switching gate 26.

The output signal of the look up table 23 with the information concerning the weighting factor on line 24 is also fed to the switching gate 26. Only when the combination circuit 13 delivers the output signal operative as control signal to the switching gate 26 the signal fed from the output 25 relating to the weighting factor (a) is transmitted and fed as a signal $S_c$ to the computing units 6 of the conversion circuits 2, 18 and 19 for determination of a new white reference value. The value $R'_p$ and the values $G'_p$ and $B'_p$ fed by conversion circuits (18 and 19) devised in accordance with circuit 2 for the green (G) and blue (B) color components respectively, will be fed for further processing to an image processing and control unit 9, from which control signals are finally generated for controlling a color reproduction system such as the color printing units 10 provided in a color copying machine.

As already stated, other series of weighting factors can be applied. For example, it is possible that as a result of the adjustment of the scanner in combination with a conventional supply of support materials for originals, the reference value lies approximately midway between the threshold value and the maximum intensity value to be detected by the scanner. In such a case it is better to assign the successive weighting levels, for example, the weighting factors in accordance with the series 1, 2, 3, 2 and 1.

The background color may vary rapidly in intensity, for example, because an original was only partly exposed to the external light. It is then possible that part of the top of the original is tinted, but the remainder is not, for example, because this part had been pushed into a book. In such a case it is appropriate for the reference value to adjust somewhat more rapidly to the changed circumstances. This is done on the basis of the data concerning the reference value ($R_{ref}$) of the previous scanned point by adapting this reference value by means of a larger fraction (b/N) of the intensity value ($R_p$) of the present scanned point and then correcting the result by a normalization factor N/(N+b). For this purpose the first computing unit 6 can advantageously be so constructed as to be suitable for the reception of signal $S_k$ and for the determination of the value of a weighted average by reference to the formula $R'_{ref}=N(R_{ref}+bR_p/N)/(N+b)$. In the determination of the weighted average, b=1 as long as the computing unit 6 is not fed a switching signal from unit 14 ($S_k=0$) and, for example, b=10 as soon as the computing unit 6 does receive the switching signal ($S_k=1$). Thus a "weighted average" is calculated to give a reference value with the new scanned point, the last scanned point, for example, being given a weighting factor b=10 and the other preceding points (a) weighting factor equal to "1." This already gives a much faster adjustment of the reference value than was possible with the formula $R'_{ref}=N(R_{ref}+R_p/N)/(N+1)$. Such a method may be used in practice only if the measured spread around the intensity values used for determining a reference value is small. One possible embodiment in this connection will be discussed in detail with reference to FIG. 5 which will be described hereinafter.

Figure 4:
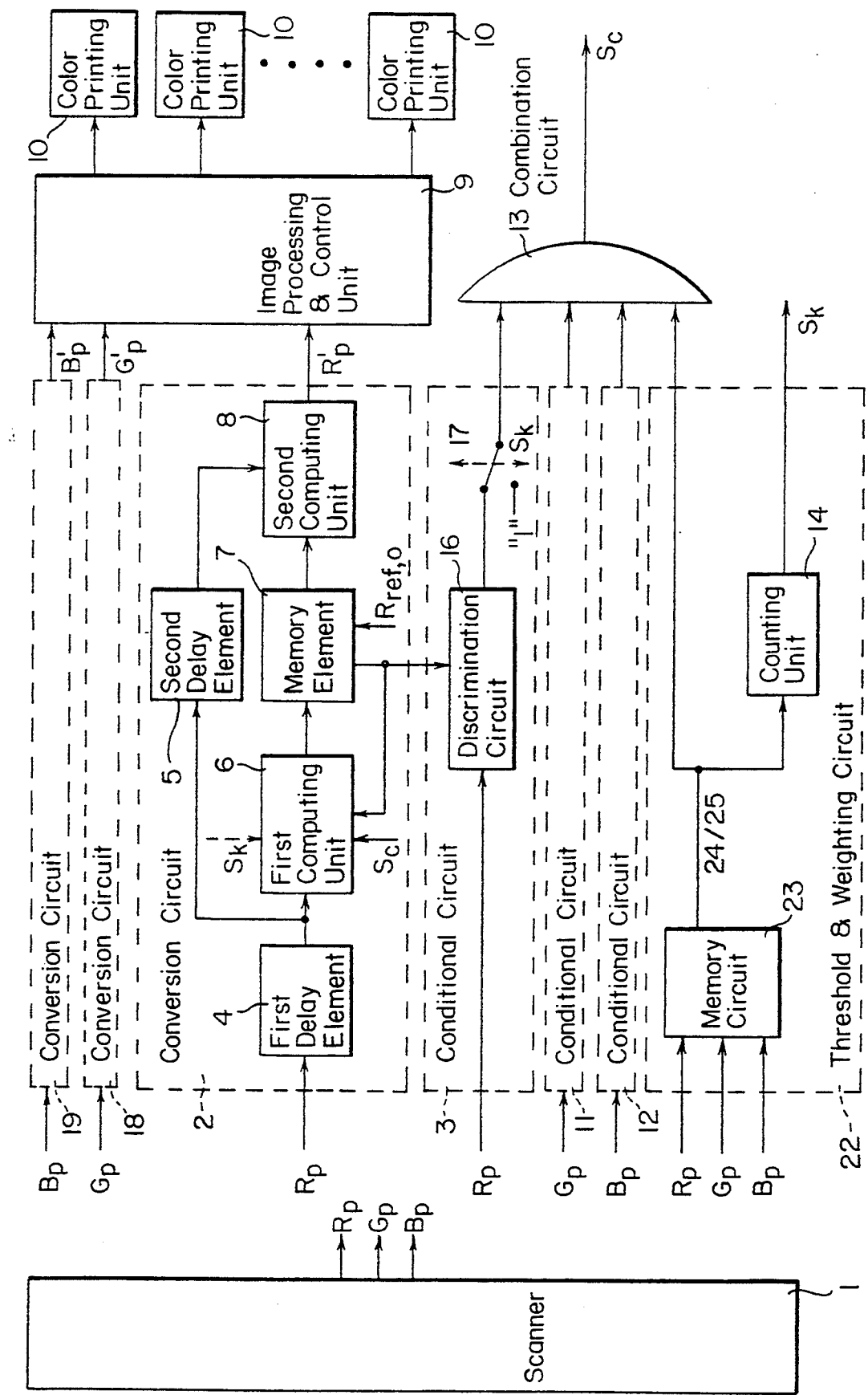
FIG. 4 is a third alternative embodiment of the color reproduction system shown in FIG. 1.

Calculation of the weighted average to give a reference value at the next scanned point can take place similarly in the first computing unit 6, the penultimate scanned point thus no longer being assigned the weighting factor b=10, but b=1. The effect of the embodiment shown in FIG. 3 is that scanned points have a much more significant part in the speed at which determination of the reference value takes place, and in the value of the white reference, according as the reference point reliability increases. This is advantageous, for example, when an original is locally smeared at the edge where scanning starts (e.g. due to toner smearing or coffee stains). A simplified embodiment of the system shown in FIG. 3 is given in FIG. 4. Units in FIG. 4 which are similar to those in FIG. 3 have been given identical reference numerals and as far as possible will not be further discussed. The memory circuit 23 contains only the information associated with the threshold value for each color component. The circuit 23 can then suffice with a combined output 24/25, from where a "logic 1" signal generated by circuit 23 is fed to the combination circuit 13 and to counting unit 14 when the intensity value of the scanned point concerned for each color component is above the associated threshold value. The switching gate 26 of FIG. 3 is superfluous in this configuration, since the output signal of the combination circuit 13 can already fulfill the function of signal $S_c$. Just as was the case in FIG. 3, the first computing unit 6 can in FIG. 4 also advantageously be so constructed as to be suitable for the reception of signal $S_k$ and for determination of the value of a weighted average by reference to formula $R'_{ref}=N(R_{ref}+b.R_p/N)/(N+b)$. In this formula b=1 as long as the computing unit 6 does not receive a switching signal from unit 14 ($S_k=0$) and, for example, b=10 as soon as the computing unit 6 does receive that switching signal ($S_k=1$). Starting with the general formula $R'_{ref}=N(R_{ref}+b.a.R_p/N)/(N+b.a)$, a suitable contribution can be provided for determining the reference value at any time by a suitable choice of the factors a and b which can be supplied by means of the signals $S_c$ and $S_k$ respectively.

One method, in which first a fairly accurate indication regarding the reference value is determined and then a rapid adaptation is carried out of the reference value once determined, is obtained by starting with the method of determining a reference value by means of intensity values using the fixed threshold value without a weighting mechanism, and then changing over to the method of determining a weighted average by reference to intensity values for each scanned point as soon, for example, as the signal $S_k=1$ is delivered and there is thus some indication regarding the reference value, in which method only the value in connection with the present scanned point being, for example, given a weighting factor b=10 and the preceding scanned points a weighting factor with the value "1".

A particularly favorable alternative of the method is obtained by starting with accurately and rapidly determining reference values by reference to a weighted average using a weighting circuit having a plurality of weighting levels, and then proceeding to rapid adaptation of a reference value once obtained, by reference to a weighted average determination without using the weighting mechanism.

Figure 5:
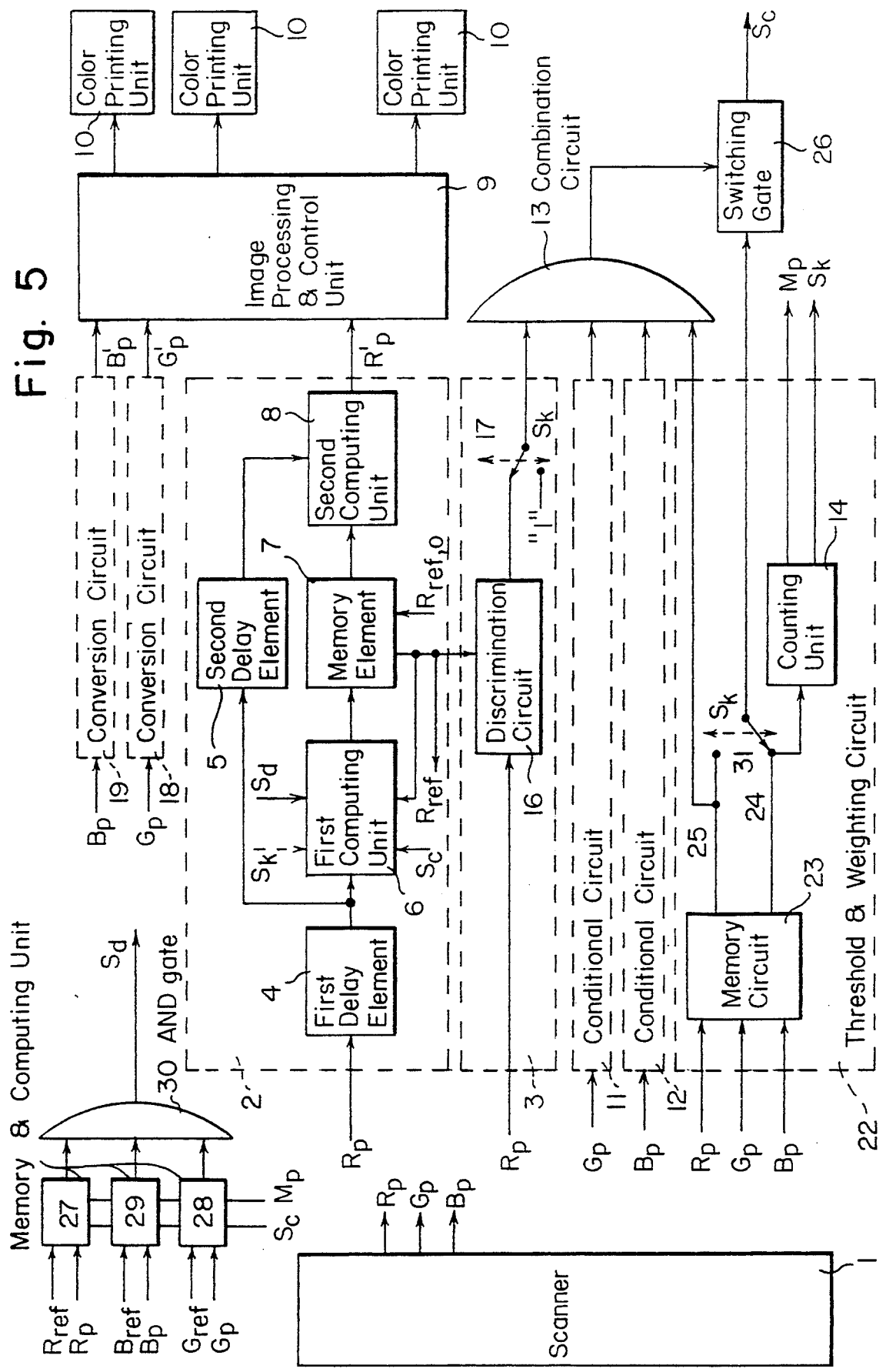
FIG. 5 is a fourth alternative embodiment of the color reproduction system shown in FIG. 1.
Figure 6B:
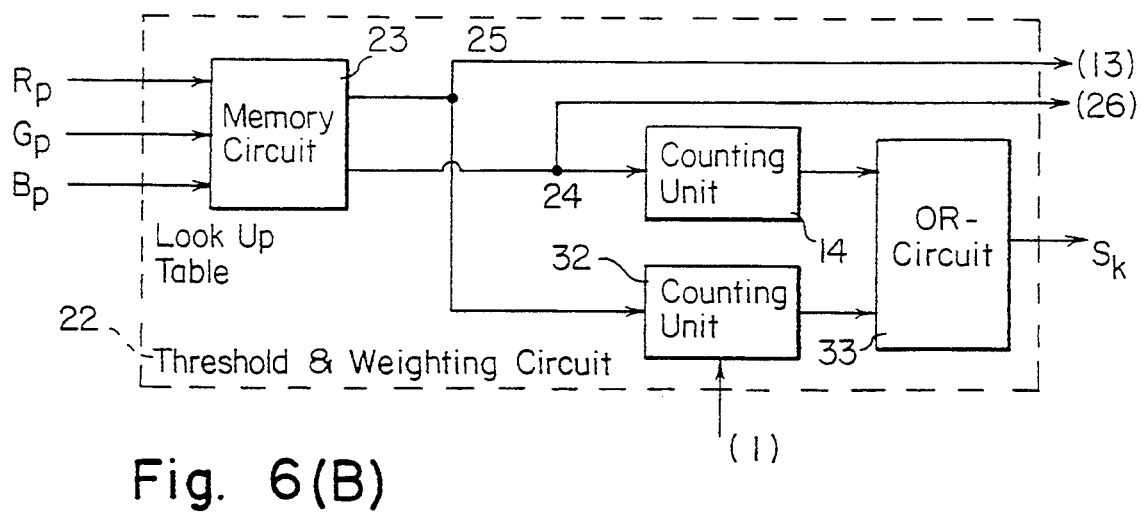
Figure 6C:
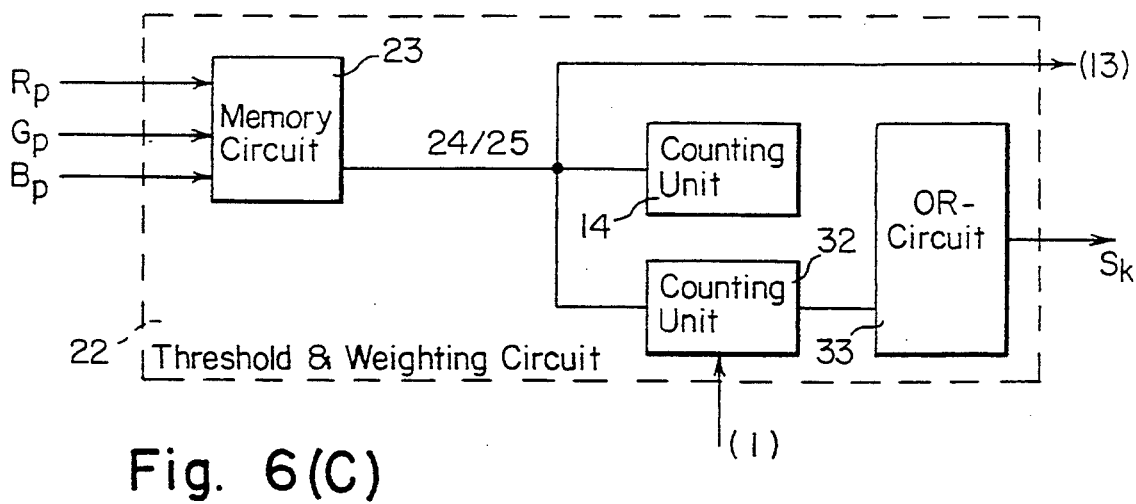
Figure 6D:
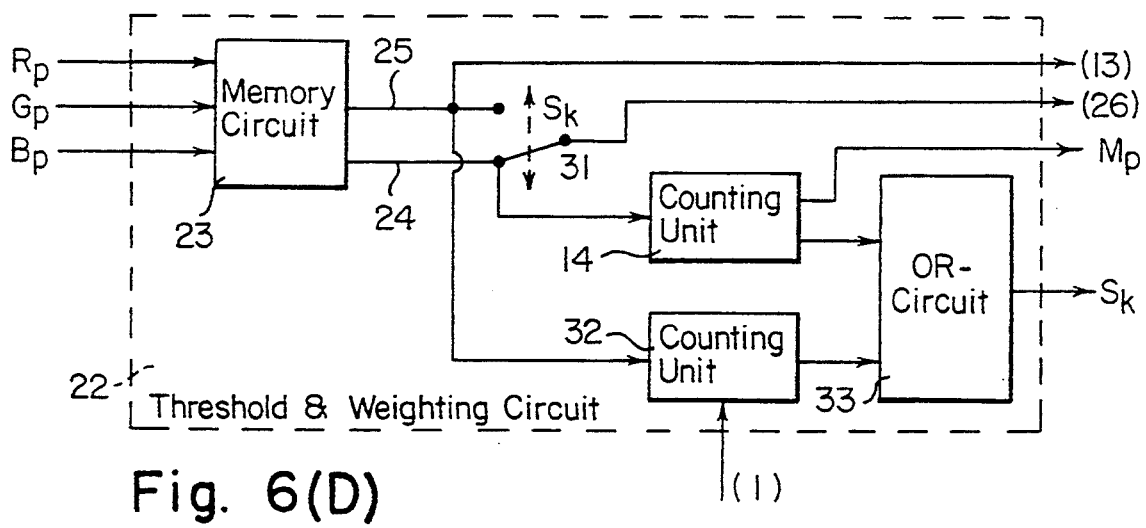

One possible embodiment of a color reproduction system operative in this way is shown in FIG. 5. Units in this Figure which are similar to units from one of the preceding Figures have identical reference numerals and where possible will not be explained in detail. This embodiment comprises three identically operative memory and computing units 27, 28 and 29 for the different color components R, G and B. It is therefore logical only to discuss in detail the action of one of these units, unit 27 in this case. The memory and computing unit 27 is suitable for calculating the spread value with respect to the reference value ($R_{ref}$) using the intensity values associated with the R-component. Here too only those intensity values which are situated above the threshold value and for which a signal $S_c$ is therefore generated will be involved in the calculation. In the method it is supposed to be known prior to generation of the signal $S_k=1$ whether the original is coarse or fine-fibred, and that for that purpose a choice must have been made between the factors b=1 and b=10. The data concerning the intensity values are temporarily stored in the memory unit 27. The memory unit 27 is also connected with memory part 7 for the supply of information concerning the calculated reference value ($R_{ref}$). At the time when a certain fraction ($M_p$) of the standard value M is reached by the counting unit 14, the signal $M_p$ is delivered by this unit. At that time the reference value ($R_{ref}$) then available is written into memory unit 27 and the spread ($\sigma$) of those values around the reference value ($R_{ref}$) is calculated using the stored intensity values. If this spread remains below a certain value $S_T$ specific to the R-color component which is indicative of the fact that the original is fine-fibred, the memory and computing unit 27 generates a "logic 1" signal for the AND gate 30. If the memory and computing units 28 and 29 also generate a "logic 1" signal, the AND gate 30 produces a logic control signal $S_d=1$ for the computing units 6 of the circuits 2, 18 and 19, the factor b=10 being selected. Determination of a weighted average will then take place by reference to the factor b=10 as soon as the signal $S_k=1$ is also generated. For this purpose use can be made of a computing unit 6 which has also been adapted to receive the signals $R_p$, $R_{ref}$, $S_k$, $S_d$ and $S_c$ for calculating the value of a weighted average by reference to the formula:

$$R'_{ref}=N(R_{ref}+baR_p/N)/(N+b.a),$$

b denoting the factor to be adjusted by signal $S_k$ and (a) the weighting factor to be supplied by signal $S_c$.

If, on the other hand, the AND gate 30 produces the signal $S_k=0$ as an indication that the spread around the intensity values is too great and the original is therefore coarse-fibred, the factor b=1 is maintained in the computing units. Adaptation of the calculated average will accordingly take place by reference to this factor (b=1).

The threshold and weighting circuit 22 is also provided with a switch 31 which is switched by means of the signal Sk. As long as the signal Sk=0 is present the switch 31 is in the switching position illustrated, and the signal SC represents the weighting factor (a) to be selected by the look up table 23. From the time that the signal Sk becomes "logic 1" the discrimination circuits 16 of the conditional circuits 3, 11 and 12 have also become operative, so that no scanned points having a wide variation in brightness value with respect to the valid reference value are permitted for calculation of a reference value, and hence there will be little variation in the weighting factors. For this reason, for the sake of simplicity, the weighting factor a=1 can be continuously maintained in the calculation then to be carried out for the reference value, and this results in the same formula as under FIG. 1. This situation is obtained by changing the switching position of switch 31 by means of signal Sk=1 so that the signal SC will represent the value "1" supplied on line 25.

Although each method according to the invention has been illustrated hereinbefore in a way in which calculation of the reference value is based on the R, G and B intensity values of the scanned points, it will be clear that the invention is not limited thereto. The R, G and B intensity values can be converted to a different color space, e.g. X.Y.Z. or L.a.b. or L.C.H. color space, the calculations being performed in the selected other color space. Of course the first reference value and the permissible first and subsequent locally valid reference values will accordingly be defined in the other color space. It is of course also possible to use look up tables in which various data required are stored. It is also possible to give the factor N in the formulas used the value of a variable which moves along with the number of scanned points already involved in determining the reference values, but in which value is tied to a certain maximum, e.g. 2047. The core of the invention, of course, relates to adaptation of the available reference value by reference to data concerning a new intensity value, and not so much to the formula to be used. For instance, when using a dark colored original with a small number of whitish objects of small size (e.g. a picture of a landscape area with a few lighted lampposts at night), it can occur, that the number (M) as to the required reference points (using weighting factors or not) is reached only in a late stage of the scanning process or not at all consequently, the scanning process remains too long in the phase, for which only the wide first criterium as to the first threshold value ($R_{thr}$, $G_{thr}$, and $B_{thr}$) is permitted to be applied. This results in a considerable variation of the reference values due to the various whitish tinted objects and consequently a shift of the color values for the whole picture. In such a case it is advantageous to use a method, which is modified with respect to a former one. According to such a modified method, there will be no waiting for the moment at which the number (M) will be reached, but the wide criterium will be used only during a predefined phase (e.g. that of the scanning of a certain number (n) of scanning lines or of a certain number (r) of scanned points or a certain number (r) of scanned points or a certain period after detection of the first reference point. After this the second criterium is involved in the process. For a practical embodiment this means that the counting unit 14 in the Figures shown is replaced by a counting unit 32 of such a design that its counting function is initiated by a signal from the combination circuit 13 (FIG. 1) or memory circuit 23 (FIGS. 3, 4, and 5) respectively at the moment of detecting the first reference point of the respective original. Thereafter, the counting value of unit 32 is increased each time a next scanning point is detected by the scanning unit 1. For this purpose, scanning unit 1 will produce a count pulse for counting unit 32. As soon as a certain number of detections of scanned points (e.g. 200,000 points) have been reached or a certain number of scan lines (e.g. 25 lines) have been scanned or a certain period has been expired, this modified counting unit 32 will generate the signal $S_k$.

Furthermore, the latter modified method can be implemented in one of the other methods, namely in such a way that the second criterium is involved in the adapting process of the reference value, as soon as either the condition of reaching the number (M) referring to the number of reference points (using weighting factors or not), or the condition of expiring the predefined period is fulfilled. This can be effected in a practical embodiment in such a way, that the counting unit 32 is coupled parallel with the counting unit 14 and that an OR-circuit 33 is connected to the outputs of the two counting units 14 and 32 to deliver the aimed signal $S_k$. The changes to be executed then in the embodiments of FIGS. 1, 3, 4, and 5 are represented by FIGS. 6A, 6B, 6C, and 6D respectively.

These and other modification possibilities will be sufficiently clear to the skilled man on the basis of the description of the invention given above so that there is no need to describe them here in detail.

Apart from determining a white reference as illustrated hereinbefore, the method according to the invention can of course also be used for determining other reference points, e.g. a black reference. For example, in determining the black reference value, only an intensity value below a certain threshold value may be involved. In determining a color reference value the threshold values will have a different function in connection with the respective color components. For example, in determining a green reference value in the case of an original having a green background color the threshold value for the green color component will imply a minimum requirement above which the intensity of this color component must be situated, and the threshold values for the red and blue color components will represent a maximum requirement below which the intensity values must be situated in order that the scanned point may also be involved in determining the green reference value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of determining a reference value for the intensity associated with a color indication variable, obtained by scanning an original with a color scanning unit, the color scanning unit being adapted to scan said original point-by-point, said method comprising determining a locally valid reference value for each scanned point and for each associated color indication variable, provided the intensity value related thereto deviates from a defined standard value by less than a preset value, by adapting, starting from the data concerning the then locally available reference value, said locally available reference value, using a fraction of the value representing the intensity in the case of the color indication variable concerned.

2. A method according to claim 1, characterized by establishing an adapted intensity value associated with a color indication variable by reference to an intensity value obtained for a scanned point for each color indication variable, Using a scale conversion function which is dependent on the locally valid reference value for said color indication variable and for said scanned point.

3. A method according to claim 2 characterized in that the determination of a locally valid reference value is effected in a first color space system and establishing said adapted intensity value relating to the color indication variable is effected in a second color space system.

4. A method according to claim 1, characterized in that a number of weighting intervals having specific weighting factors are assigned to defined area which deviates from the standard value by less than the preset value, for the determination, using weighting factors, of the size of said fraction of the values representing the intensity of the associated color indication variable for adaptation of the then locally available reference value.

5. A method according to claim 4, characterized in that the determination, using weighting factors, of the size of the value representing the intensity of the associated color indication variable takes place only during a certain number of reference determinations.

6. A method according to claim 1, in which the intensity value to be determined for each scanned point and for each color indication variable is obtained by said color scanning unit operating line-by-line, characterized in that for each two consecutive scanning lines the scanning of said scanning lines is effected in opposite directions.

7. A method according to claim 1, characterized in that the determination of a locally valid reference value for a scanned point is effected on the condition applicable to each color indication variable that the deviation of the intensity value from the color indication variable related to that scanned point is smaller, with respect to the associated reference value, than a preset value.

8. A method according to claim 7, characterized in that the determination of a locally valid reference value for a scanned point under said condition takes place after a certain number of locally valid reference values have been established after the beginning of scanning the respective original.

9. A method according to claim 7, characterized in that the determination of a locally valid reference value for a scanned point under said condition takes place after a predefined phase of detecting scanned points has expired succeeding the first actual determination of a reference value for said original.

10. A method according to claim 7, characterized in that the preset value is gradually reduced from a first value to a second value.

11. A method according to claim 4, characterized in that a certain value is established for each scanned point by reference to a weighted number of locally valid reference values to be determined with weighting factors after the start of scanning of an original and in that as soon as the weighted number reaches a predefined value, the determination of a locally valid reference value for a following scanned point is effected on the condition, applicable for each color indication variable, that the deviation of the intensity value from the color indication variable related to that scanned point is smaller, with respect to the associated reference value, than a preset value.

12. A method according to claim 1, characterized in that the locally valid reference value is established at a preset value at the beginning of scanning the associated original.

13. A color reproduction system, comprising a color scanning unit for point-by-point scanning of an original and generation of associated color information and an image processing and control unit for correcting and processing said color information to give control signals for controlling a color printing unit, said system being adapted to determine a reference value for the intensity associated with a color indication variable, said color reproduction system being further provided with a first computing means for determining a locally valid reference value for each scanned point and for each color indication variable, provided the intensity value related thereto deviates from a defined standard value by less than a preset value, by adapting, starting from the data concerning the then locally available reference value, this available reference value, using a fraction of the value representing the intensity in the case of the color indication variable concerned, and is also provided with a second computing means for establishing an adapted intensity value by reference to the intensity value determined for that scanned point for each color component, using a scale conversion function based on the locally valid reference value for said scanned point, in order to give color information to be supplied to said image processing and control unit.

14. A color reproduction system according to claim 13, characterized in that said system is provided with transformation means for transforming to another color space system the locally valid average intensity values generated by the first computing means for each color indication variable.

* * * * *